United States Patent
Rivers et al.

(10) Patent No.: US 10,712,166 B2
(45) Date of Patent: Jul. 14, 2020

(54) ELECTRONIC NAVIGATION SYSTEMS WITH USER AND SIMULATION PROFILES

(71) Applicant: FLIR Belgium BVBA, Meer (BE)

(72) Inventors: Mark Rivers, Winchester (GB); Christopher Daniel Gatland, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 0 days.

(21) Appl. No.: 15/853,545

(22) Filed: Dec. 22, 2017

(65) Prior Publication Data
US 2018/0188064 A1 Jul. 5, 2018

Related U.S. Application Data

(60) Provisional application No. 62/442,301, filed on Jan. 4, 2017.

(51) Int. Cl.
*G01C 21/36* (2006.01)
*G01C 21/20* (2006.01)

(52) U.S. Cl.
CPC ......... *G01C 21/3664* (2013.01); *G01C 21/20* (2013.01); *G01C 21/203* (2013.01)

(58) Field of Classification Search
CPC ... G01C 21/3664; G01C 21/20; G01C 21/203
See application file for complete search history.

(56) References Cited

U.S. PATENT DOCUMENTS

| | | | |
|---|---|---|---|
| 9,694,771 B1* | 7/2017 | Ding | B60R 16/037 |
| 2005/0261815 A1* | 11/2005 | Cowelchuk | B60Q 5/00 |
| | | | 701/36 |
| 2014/0309806 A1* | 10/2014 | Ricci | B60R 25/1004 |
| | | | 701/1 |
| 2014/0309870 A1* | 10/2014 | Ricci | B60W 50/14 |
| | | | 701/36 |
| 2015/0160020 A1* | 6/2015 | van Hemert | A61B 5/18 |
| | | | 701/532 |
| 2015/0180999 A1* | 6/2015 | Pisz | B60K 35/00 |
| | | | 709/204 |
| 2017/0041524 A1* | 2/2017 | Schoenen | H04N 5/23206 |

OTHER PUBLICATIONS

"9 secrets of Google Maps on your iPad" by Chris Smith, Sep. 23, 2014 on the British Telecommunications website, retrieved from http://home.bt.com/tech-gadgets/phones-tablets/9-secrets-of-google-maps-on-your-ipad-11363933817955 (Year: 2014).*

* cited by examiner

*Primary Examiner* — Tyler J Lee
(74) *Attorney, Agent, or Firm* — Haynes and Boone, LLP

(57) ABSTRACT

Electronic navigation systems may be provided with user and/or demo profiles. Each user or demo profile may define a specific settings regarding display layout, user preferences, and various functions and features displayed or provided at an electronic navigation system. A user profile may define specific display preferences on a menu screen for a profile owner. A demo profile may define specific functions/features displayed on a screen for demonstrating use with a specific type of vehicle or a specific type of activity. Each demo profile also may store simulation data that allow the electronic navigation system to simulate the use of the navigation system with a specific type of vehicle or a specific type of activity. The electronic navigation system may allow users to create a new profile, edit an existing profile, and/or activate or deactivate an existing profile.

18 Claims, 15 Drawing Sheets

ELECTRONIC NAVIGATION SYSTEMS WITH USER AND SIMULATION PROFILES

CROSS-REFERENCE TO RELATED APPLICATIONS

This application claims the benefit of and priority to U.S. Provisional Patent Application No. 62/442,301 filed Jan. 4, 2017 and entitled "ELECTRONIC NAVIGATION SYSTEMS WITH USER AND SIMULATION PROFILES," which is incorporated herein by reference in its entirety.

TECHNICAL FIELD

One or more embodiments of the invention relate generally to electronic navigation systems and more particularly, for example, to systems and methods for providing user and simulation profiles on electronic navigation systems.

BACKGROUND

Electronic navigation systems are designed to serve various types of users. Different users may have different needs, priorities, and preferences. It may be cumbersome for a user of an electronic navigation system having to reset and enter personalized settings each time after another user used the system.

Further, electronic navigation systems may be used for various types of vehicles or various types of activities. Different types of vehicles or activities may utilize different features and/or functions on the electronic navigation system. When demonstrating functions or features of an electronic navigation system for a certain type of vehicle or for a certain type of activity, viewers or users may be distracted by functions or features that are not relevant to the demonstrated vehicle or activity. For example, kayakers may not use the radar functions on the electronic navigation system or yachtsmen rarely use the side-looking sonar functions on the electronic navigation system.

Thus, there is a need for electronic navigations systems that provide relevant functions or features based on the user, the type of vehicle, or the type of activity.

SUMMARY

Techniques are disclosed for systems and methods to provide user and simulation profiles for electronic navigation systems on mobile structures. In accordance with one or more embodiments, an electronic navigation system may include and/or be configured to communicate with a logic device, a memory, one or more sensors, one or more actuators/controllers, and modules to interface with users, sensors, actuators, and/or other modules of a mobile structure. The logic device may be adapted to retrieve and activate a user or demo profile to display function buttons based on settings defined in the activated user or demo profiles. For example, various function buttons, such as sonar, radar, weather, and the like, may be presented in a home screen or a main menu of the electronic navigation system based on settings defined in an activated user or demo profile.

In various embodiments, an electronic navigation system may include an orientation sensor, a position sensor, a gyroscope, an accelerometer, and/or one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to communicate with a user interface for a mobile structure, wherein the logic device is adapted to retrieve a profile defining settings of the user interface; determine that the profile is activated; and configure the user interface based on the settings defined by the profile.

In another embodiment, a method may include retrieving a profile defining settings of a user interface; determining that the profile is activated; and configuring the user interface based on the settings defined by the profile.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, electronic navigation systems may be provided with user and/or demo profiles. Each user or demo profile may define specific settings regarding display layout, user preferences, languages, and various functions and features displayed or provided at an electronic navigation system. For example, a user profile may define specific display preferences on a menu screen for a profile owner. In another example, a demo profile may define specific functions/features displayed on a screen for demonstrating use with a specific type of vehicle or a specific type of activity.

The electronic navigation system may allow users to create a new profile, edit an existing profile, and activate or deactivate an existing profile. For example, the navigation system may be used by multiple users each may activate his/her own user profile to access his/her preferred settings or configuration on the navigation system, without affecting the settings or configuration of other users.

The electronic navigation system may store various demo profiles each define settings and configuration for a specific type of vehicle or for a specific type of activity. Each demo profile also may store simulation data that allow the electronic navigation system to simulate the use of the navigation system with a specific type of vehicle or a specific type of activity.

One or more embodiments of the described electronic navigation system may advantageously include a controller and one or more of and one or more of an orientation sensor, a gyroscope, an accelerometer, a position sensor, a speed sensor, and/or a steering sensor/actuator providing measurements of an orientation, position, acceleration, speed, and/or steering angle of the mobile structure. For example, the sensors may be mounted to or within the mobile structure (e.g., a watercraft, aircraft, motor vehicle, and/or other mobile structure), or may be integrated with the user interface and/or the controller. In some embodiments, the disclosed system may be adapted to execute one or more control loops configured to retrieve a profile defining settings of a user interface; determine that the profile is activated; and configure the user interface based on the settings defined by the profile. This allows a user to setup and save his/her personal settings, such that the user may quickly and easily configure the user interface according to his/her personal settings and preferences.

Figure 1A:
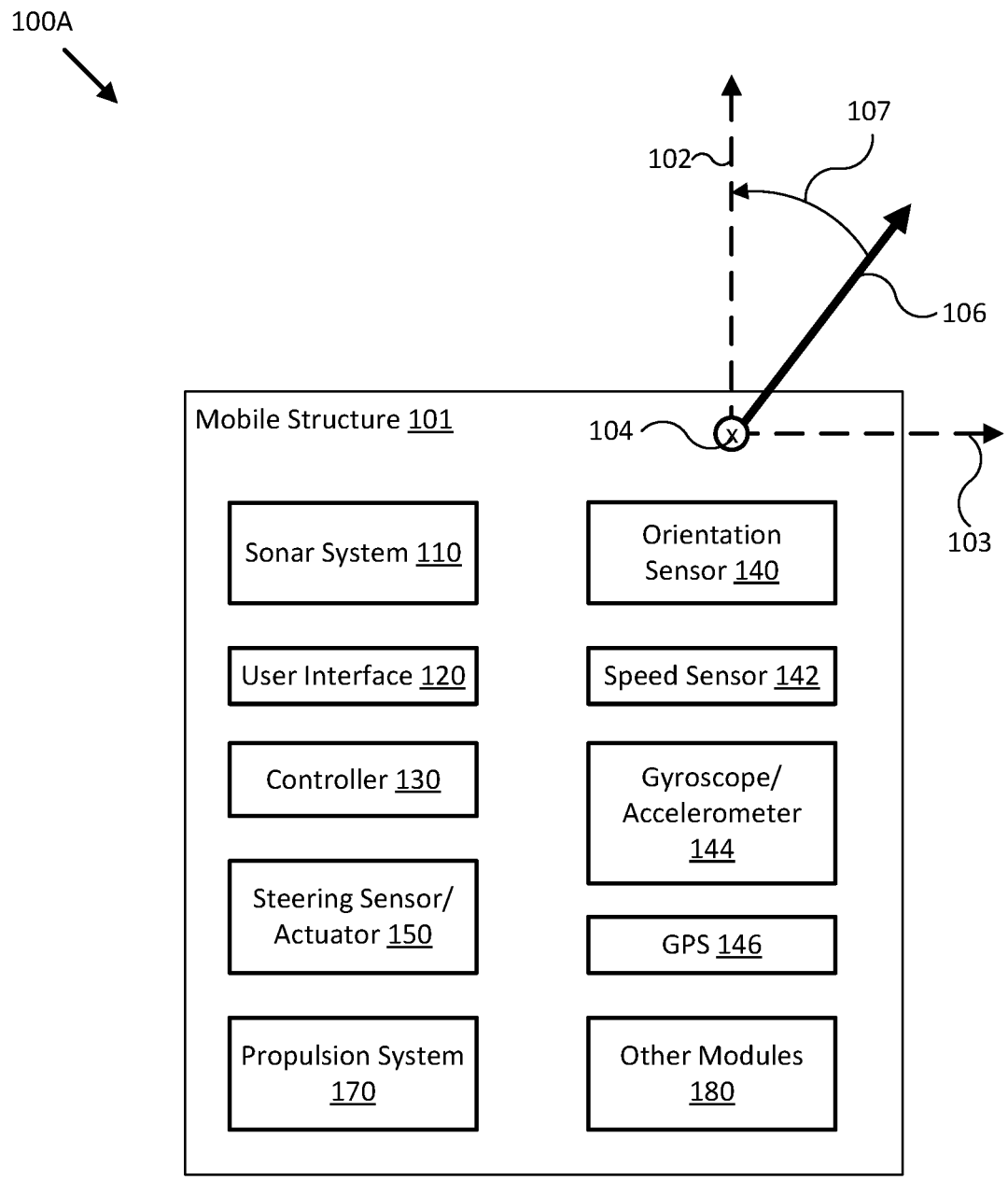
FIG. 1A illustrates a block diagram of a mobile structure including a portion of an electronic navigation system in accordance with an embodiment of the disclosure.

As an example, FIG. 1A illustrates a block diagram of a mobile structure 101 including a portion of an electronic navigation system 100 in accordance with an embodiment of the disclosure. In various embodiments, system 100 may be adapted to provide navigation, display, and/or corresponding directional control for a particular mobile structure 101. Directional control of a mobile structure may refer to control of any one or combination of yaw, pitch, or roll of mobile structure 101. In some embodiments, system 100 may be adapted to measure an orientation, a position, an acceleration, and/or a speed of mobile structure 101. System 100 may then use these measurements to control operation of mobile structure 101, such as controlling steering actuator 150 and/or propulsion system 170 to steer mobile structure 101 according to a heading along a retrieved route, such as heading angle 107, for example In the embodiment shown in FIG. 1A, system 100 may be implemented to provide user profiles defining user preferences and settings for different users. System 100 may also provide demo profiles for demonstrating functions and/or features in various types of mobile structures 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data.

Sonar system 110 may be configured to provide such data and/or imagery to user interface 120 for display to a user, for example, or to controller 130 for additional processing.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to accept user input and provide the user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), render and/or display a user interface, determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to configure sonar system 110, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be processed internally and/or transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly of sonar system 110) overlaid on a geographical map, which may include a race route, waypoints, one or more graphs indicating a corresponding time series of actuator control signals, sonar data and/or imagery, and/or other sensor and/or control signals. For example, in some embodiments, user interface 120 may be implemented and/or operated according to any one or combination of the systems and methods described in U.S. Provisional Patent Application No. 62/099,059 filed Dec. 31, 2014 and entitled "COORDINATED ROUTE DISTRIBUTION SYSTEMS AND METHODS", and/or U.S. Provisional Patent Application No. 61/949,864 filed Mar. 7, 2014, 2014 and entitled "SAILING USER INTERFACE SYSTEMS AND METHODS", which are hereby incorporated by reference in their entirety.

In some embodiments, user interface 120 may be adapted to accept user input including a user-defined target heading, route, and/or orientation for a transducer assembly, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device coupled to mobile structure 101 (e.g., sonar system 110), for example, and to generate control signals for adjusting an orientation of the actuated device according to the target attitude. More generally, user interface 120 may be adapted to display a user interface and/or sensor information to a user, for example, and/or to transmit sensor information and/or user input to other user interfaces, sensors, or controllers of system 100, for instance, for display and/or further processing.

In some embodiments, user interface 120 may be adapted to accept user input for activating, modifying, and storing user profiles and/or demo profiles that define menu displays and/or layouts of the electronic navigation system 100. For example, different functions and/or features may be displayed and positioned differently in different user profiles based on different users' preferences and settings. In another example, different functions and/or features may be displayed and positioned differently in different types of vehicles and/or different types of activities.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store user profiles, demo profiles, configuration settings, sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or other signals provided by a logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. For example, in some embodiments, propulsion system 170 may be implemented as a sailing propulsion system including one or more masts, booms, sails, and/or one or more sensors and/or actuators adapted to sense and/or adjust a boom angle, a sail trim, and/or other operational parameters of a sailing propulsion system, as described herein.

In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In further embodiments, other modules 180 may include a VHF radio receiver, a mobile phone and/or a mobile phone interface, and/or a camera configured to receive race route data and/or IDs from a race route generator and/or distribution server, as described herein.

In general, each, of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to receive and/or display race route data and/or IDs, and/or store sensor information, configuration data, and/or other data corresponding to operation of system 100, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
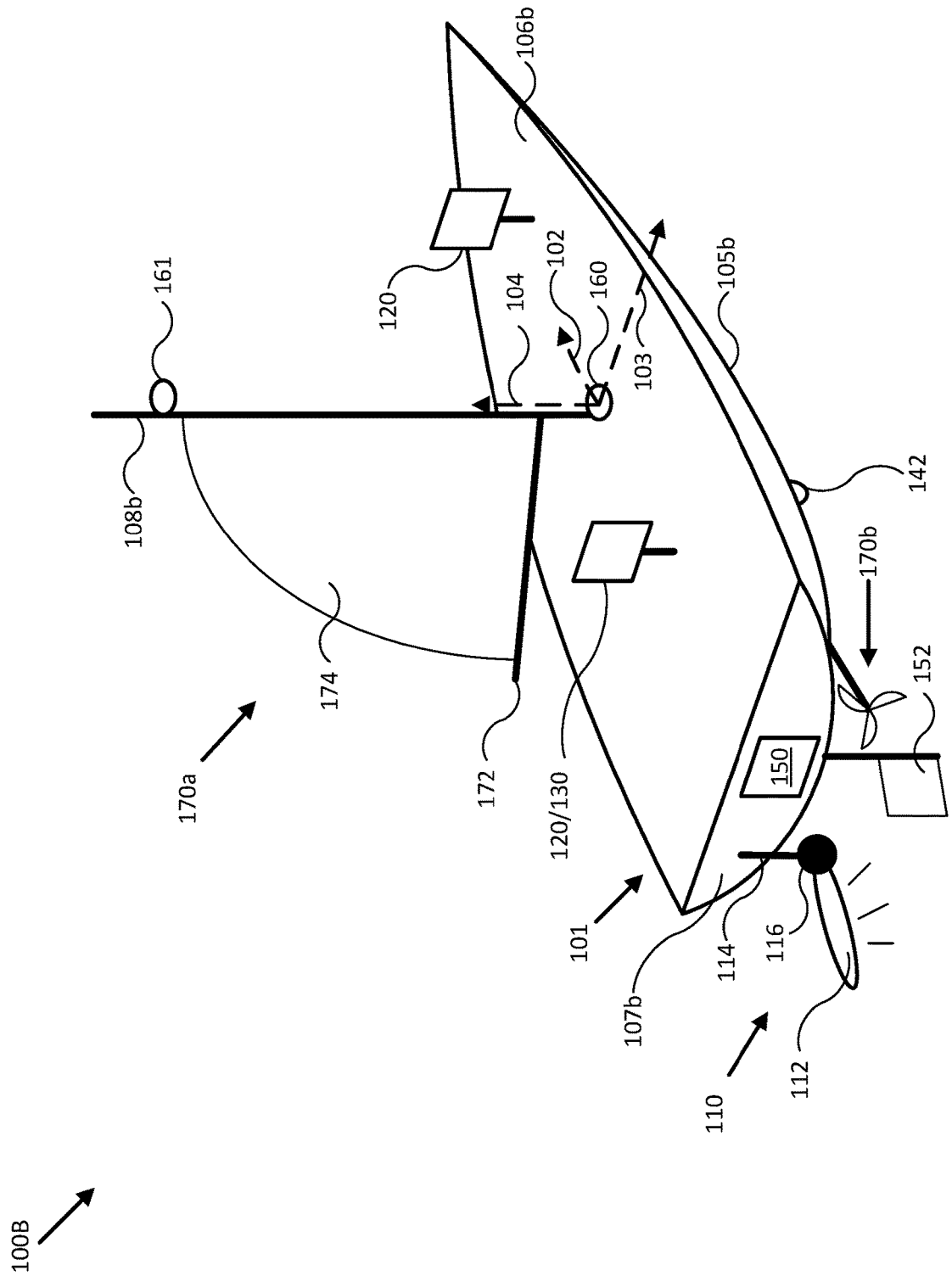
FIG. 1B illustrates a diagram of a watercraft including a portion of an electronic navigation system in accordance with an embodiment of the disclosure.

FIG. 1B illustrates a diagram of system 100B in accordance with an embodiment of the disclosure. In the embodiment shown in FIG. 1B, system 100B may be implemented to provide electronic navigation for use with operation of mobile structure 101, similar to system 100 of FIG. 1A. For example, system 100B may include sonar system 110, integrated user interface/controller/sonar controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a ship including a hull 105b, a deck 106b, a transom 107b, a mast/sensor mount 108b, a rudder 152, a sail system 170a and/or an inboard motor 170b, and sonar system 110 including transducer assembly 112 coupled to transom 107b. In other embodiments, hull 105b, deck 106b, mast/sensor mount 108b, rudder 152, propulsion systems 170a and/or 170b, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

Also depicted in FIG. 1B, sail system 170a of mobile structure 101 includes sail 174 coupled to mast/sensor mount 108b and boom 172. Other embodiments of sail system 170 may include multiple sails, masts, and/or booms in various configurations, such as configurations including one or more jibs, spinnakers, mainsails, headsails, and/or various multi-mast configurations. In some embodiments, sail system 170 may be implemented with various actuators to adjust various aspects of sail system 170, such as a boom angle for boom 172 or a sail trim for sail 174. For example, a portion of either mast/sensor mount 108b or boom 172 may be configured to rotate under power from a corresponding mast or boom actuator (e.g., embedded within mast/sensor mount 108b and/or boom 172) and partially or fully furl sail 174. In one embodiment, user interface/controller 120/130 may be configured to determine an estimated maximum speed for mobile structure 101 for a particular orientation (e.g., heading/yaw, roll, and/or pitch) of mobile structure 101 relative to a current wind direction, for example. In such embodiment, user interface/controller 120/130 may be configured to steer mobile structure 101 towards the corresponding heading using steering sensor/actuator 150 and/or to adjust a roll and/or pitch of mobile structure 101, using actuators to adjust a boom angle of boom 172 and/or a furl state of sail 174 for example, to conform mobile structure 101 to the corresponding particular roll and/or pitch to help reach the estimated maximum speed.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b (e.g., at imager cluster 161) to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 1C:
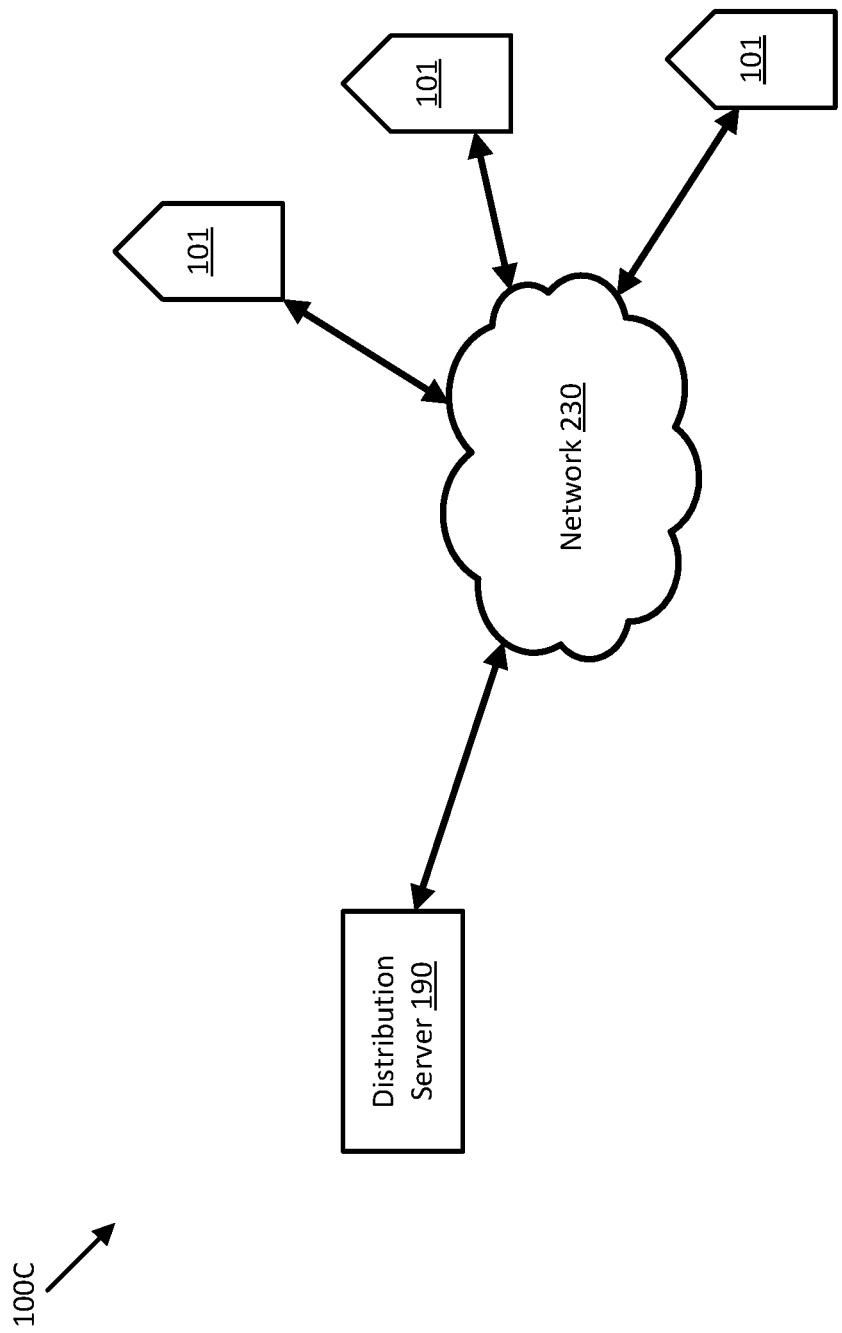
FIG. 1C illustrates a block diagram of a user/demo profile distribution and/or display system in accordance with an embodiment of the disclosure.

FIG. 1C illustrates a block diagram of a user/demo profile distribution and/or display system 100C in accordance with an embodiment of the disclosure. As can be seen in FIG. 1C, system 100C may include various mobile structures 101 each configured to receive profile data from distribution server 190 via network 230. Each of mobile structures 101 and (e.g., watercraft) may be implemented as described with respect to mobile structure 101 of FIGS. 1A and 1B. In various embodiments, communication network 230 may include one or more wired and/or wireless network interfaces, protocols, topologies, and/or methodologies, as described herein. For example, communication network 230 may include portions of the Internet, a cellular network, and/or other networks.

In some embodiments, user or demo profiles may be stored locally at mobile structure 101. In some embodiments, distribution server 190 may implement a profile database to store and manage user and demo profiles associated with different user accounts. For example, a user or an administrator of a mobile structure 101 may set up an account at distribution server 190 and may store user or demo profiles within the account. As such, the user may access and retrieve the user's profiles stored at distribution server 190 from each of mobile structures 101.

In some embodiments, distribution server 190 may analyze various profiles from different users to determine similarities and trends. As such, distribution server 190 may generate and suggest a profile to a user based on crowd sourcing. For example, distribution server 190 may determine that certain profiles settings are favored by similar users and may suggest the profile settings to a user who is similar to an identified group of users (e.g., has or is associated with one or more operational, geographical, and/or other profile characteristics common or similar to those of an identified group of users, which may be identified by shared, common, or similar profile characteristics and/or self-identified, such as by enrollment in a particular group of users with, for example, common intrinsic or extrinsic interests or characteristics). Distribution server 190 may allow users to share their profiles, such as by making their profiles public or allowing users to send profiles to others. Distribution server 190 may provide a search function that allows a new user to search and find profiles that may share similar interests as the new user. For example, a user may search for profiles based on a type of mobile structure, a type of activity, user interests, geographical regions, and the like. Distribution server 190 may allow user groups for users who shared certain interests. Distribution server 190 may provide social networking functions that allow users to connect and share profiles.

Distribution server 190 may be implemented as a logic device, a tablet computer, laptop, desktop, and/or server computer that may be configured to implement a profile database that stores and manages user or demo profiles associated with different user accounts and provide the user or demo profiles to mobile structures 101 when requested by users. In one embodiment, distribution server 190 may be implemented as an email server, a twitter server, an FTP server, a text message server, and/or other data and/or ASCII file server configured to allow and/or mediate distribution of profiles, such as over network 230.

In embodiments where mobile structures 101 are configured to provide operational data back to distribution server 190, distribution server 190 may be configured to receive the operational data and update profile information stored in the profile database. Although network 230 is shown as one element in FIG. 1C, in various embodiments, network 230 may include multiple network infrastructures and/or combinations of infrastructures where, for example, each mobile structure 101 may be configured to use substantially different network infrastructures to access distribution server 190.

In additional and/or related embodiments, a user interface of a mobile structure 101 in FIG. 1C (e.g., user interface 120 and/or controller 130) may be configured to receive user input selecting a user profile, for example, which may include user profile information (e.g., networking and/or user authentication, encryption, destination, and/or other network communication information) sufficient to establish a communication link with distribution server 190 over network 210 and to link operation of user interface 120 and/or mobile structure 101 with a corresponding user account on distribution server 190. In one embodiment, such communication link may be used to initiate a user account on distribution server 190. For example, in various embodiments, distribution server 190 may be configured to accept such communication links (e.g., to link to or establish a user account residing on distribution server 190) only from a particular type of user interface 120 and/or a particular application executed by user interface 120 and/or controller 130, which may be mediated by signatures, certificates, and/or other user/server authentication techniques.

Alternatively, or as supplemental embodiments, a user interface of a mobile structure 101 in FIG. 1C (e.g., user interface 120 and/or controller 130) may be configured to receive user input selecting a user account, for example, which may include user account information (e.g., networking and/or user authentication, encryption, destination, and/or other network communication information) sufficient to establish a communication link with distribution server 190 over network 210 and to link operation of user interface 120 and/or mobile structure 101 with a corresponding user account on distribution server 190. In such embodiments, user interface 120 may be configured to retrieve a user profile associated with the identified user account (e.g., which may be selected by user input provided to user interface 120) from distribution server 190 and to configure user interface 120 and/or other devices associated with mobile structure 101 according to the retrieved user profile.

Figure 2A:
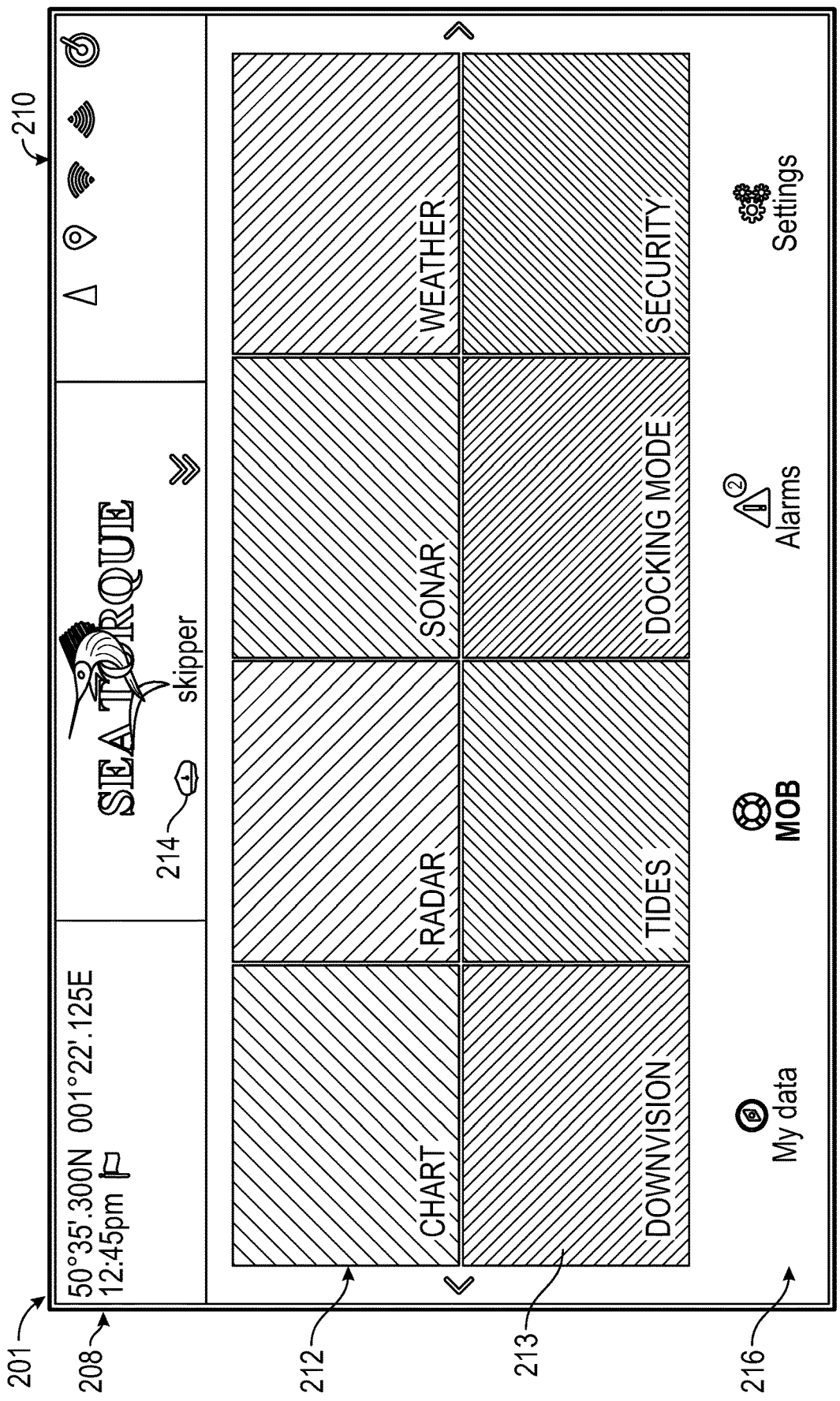
FIGS. 2A-2C illustrate display views of menus associated with various user profiles in accordance with embodiments of the disclosure.
Figure 2B:
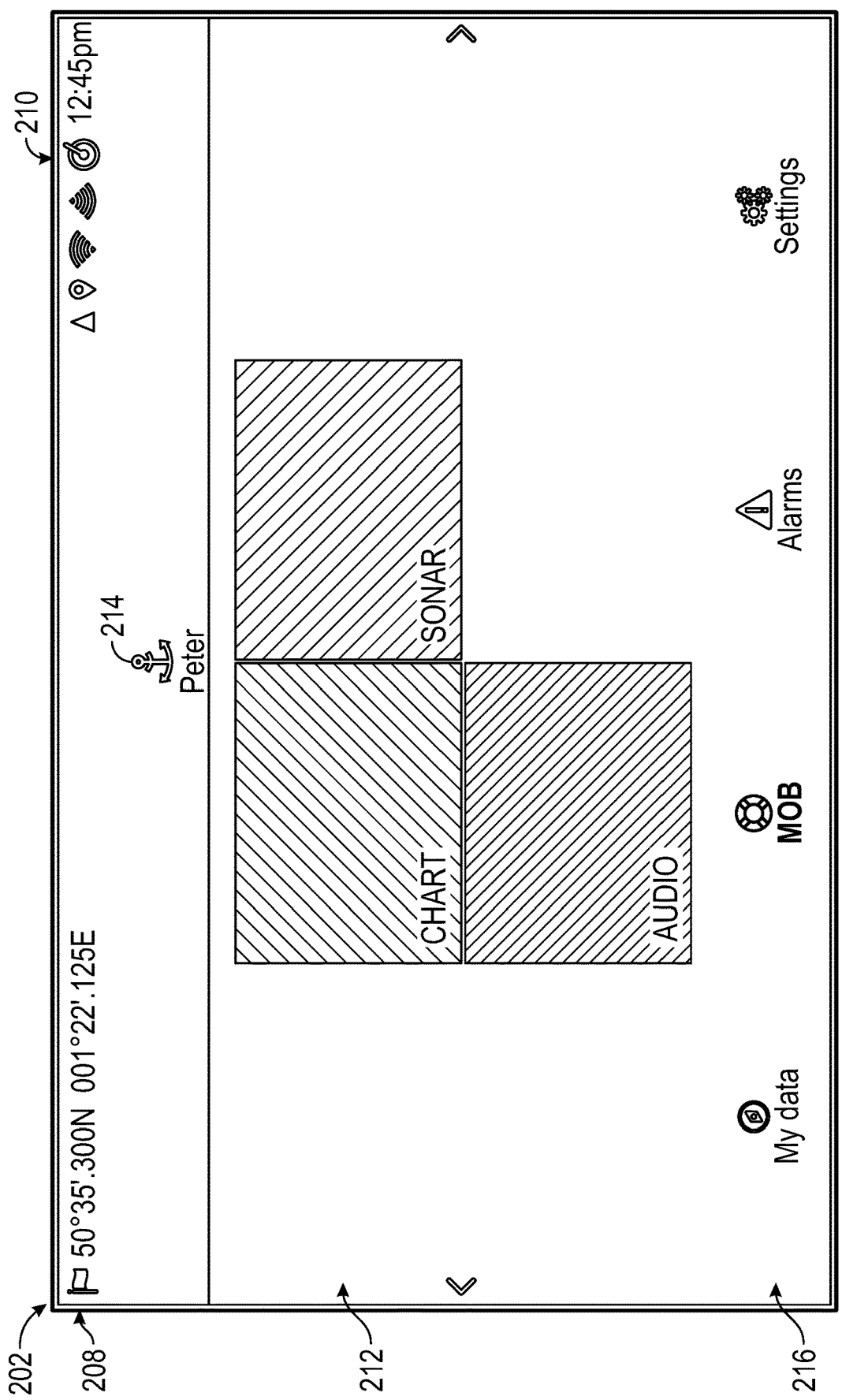
Figure 2C:
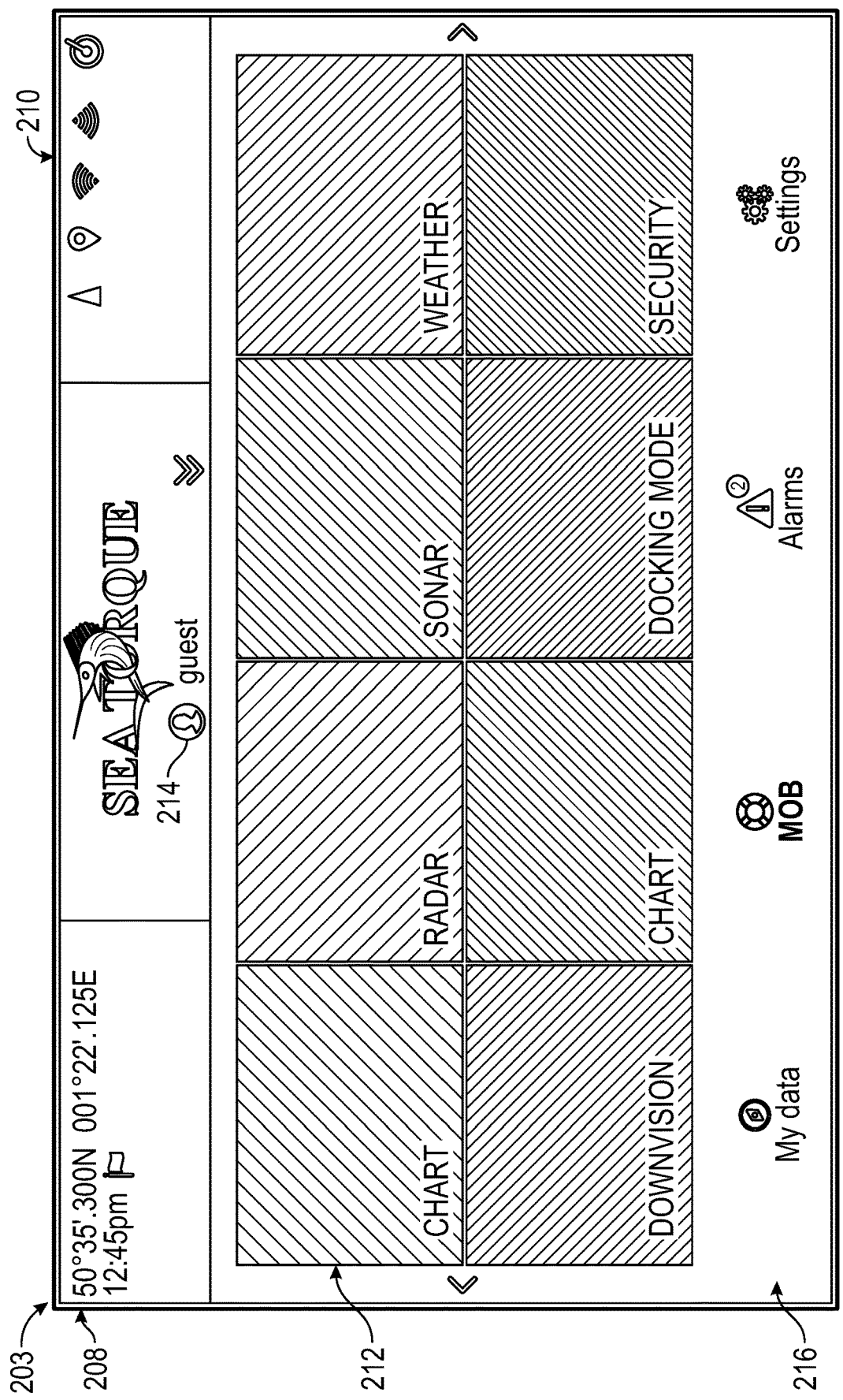

FIGS. 2A-2C illustrate various display views of a user interface 120 (e.g., which may be implemented as a touch screen or otherwise electronically selectable user interface) in accordance with embodiments of the disclosure. As shown in FIG. 2A, display view 200 may be a home screen or a main menu that includes headers 208 and 210, function display area 212, active profile indicator 214, settings selection area 216. Header 210 may display various current conditions of system 100 and/or mobile structure 101. For example, the current time and the geographical location (e.g., GPS coordinates) of mobile structure 101 may be displayed at header 208 and continuously updated as mobile structure 101's position changes.

Header 210 may display status icons indicating operating status of various sensors or communication interface, such as the status of radar, sonar, wireless communication links, and the like. The status icons may change shape and/or color based on the changing status of the various sensors or communication interface. For example, the color green may indicate that a sensor or wireless communication interface is operational or active while the color red or orange may indicate that the sensor or wireless communication interface is non-operational, inactive, or in error. In another example, different shapes or color may indicate the strength of a signal reception of a wireless communication interface or the detected activities by a sensor.

Profile indicator 214 may indicate the user or demo profile that is currently active. For example, as shown in FIG. 2A, profile indicator 214 indicates that a skipper profile is active. Profile indicator 214 may include a text and a graphical icon indicating the active profile which defines the display and layout of the menu screen. The text may describe the name of the active profile. The graphical icon may be a graphical representation, such as a facial picture, of the user associated with the profile. As described later, the profile indicator 214 may be selectable by a user to access a profile selection menu.

Settings selection area 216 may include selectable buttons for functions, such as a "My data" button, a "MOB" button, an "Alarms" button, and a "Settings" button. The "My data" button may be selected by a user to access the data related to the user. The "MOB" button may be selected to initiate an alarm or an alert indicating that a person is overboard. The "Alarms" button may be selected to view system alarms. The "Settings" button may be selected to access various system settings.

Function display area 212 may display various functions that are selectable by a user, such as by tapping (via a touch screen) or by clicking (via a computer input device) on one of the function buttons 213. The function buttons may include a "CHART" button, a "RADAR" button, a "SONAR" button, a "WEATHER" button, a "DOWNVISION" button, a "TIDE" button, a "DOCKING MODE" button, and a "SECURITY" button.

The "CHART" button may be selected by a user, such as by tapping or clicking on the area of user interface 120 corresponding to the "CHART" button to activate the chart function. The chart function may display a chart illustrating the position of the mobile structure 101 on a map (E.g., FIG. 5). The "RADAR" button may be selected by a user to activate the radar function, which may allow the user to operate the radar installed on mobile structure 101 to display objects detected by the radar installed on mobile structure 101. The radar detected objects may be overlaid on the map. The "SONAR" button may be selected by a user to activate the sonar function, which may allow the user to operate the sonar device installed on mobile structure 101 to detect underwater objects.

The "WEATHER" button may be selected by a user to activate the weather function, which may retrieve and display weather related information to the user, such as temperature, current weather condition, barometer reading, wind speed, water condition, water temperature, weather forecast, and the like. Weather related information may be derived from sensor readings of sensors installed on mobile structure 101 and/or from information received (e.g. wirelessly) from external sources, such as radio or cellular communication.

The "DOWNVISION" button may be selected by a user to activate the down vision function, which may display an underwater view of mobile structure 101. The "TIDES" button may be selected by a user to activate the tides function, which may display tides related information. The "DOCKING MODE" may be selected by a user to place the system in the docking mode. The "SECURITY" button may be selected by a user to access security related functions, such as setting system restrictions, accesses, passwords, and the like.

Based on the activated profile, different function buttons may be displayed and arranged differently in the home screen or the main menu. For example, in FIG. 2A, the "skipper" profile is activated, and eight function buttons are displayed in the home screen or the main menu. In FIG. 2B, a "Peter" profile is activated, and three function buttons (e.g., "CHART," "SONAR," and "AUDIO") are displayed in the home screen or the main menu. Controller 130 may store various user profiles and demo profiles each with different settings, configuration, and preferences that define different sets of functions that are available to the user.

In some embodiments, a user profile may be created for a group. For example, the skipper profile may be created for when a group of friends who regularly sail together. As such, the shared preferences among the group of friends may be customized for the group profile. In some embodiments, controller 130 may allow customization of various settings, such as color theme, background image, language, time zone, geographical region/location, and other customizable settings within a profile.

Controller 130 may include a guest profile with predetermined settings. As shown in FIG. 2C, the guest profile may provide default functions, such as "CHART," "RADAR," "SONAR," "WEATHER," "DOWNVISION," "DOCKING MODE," and "SECURITY." A guest user may make changes in user interface 120; however, controller 130 may not save the changes made by a guest user. Thus, after a guest user logs out of user interface 120, changes to the settings made by the guest user in the guest profile may be erased from memory.

Figure 4A:
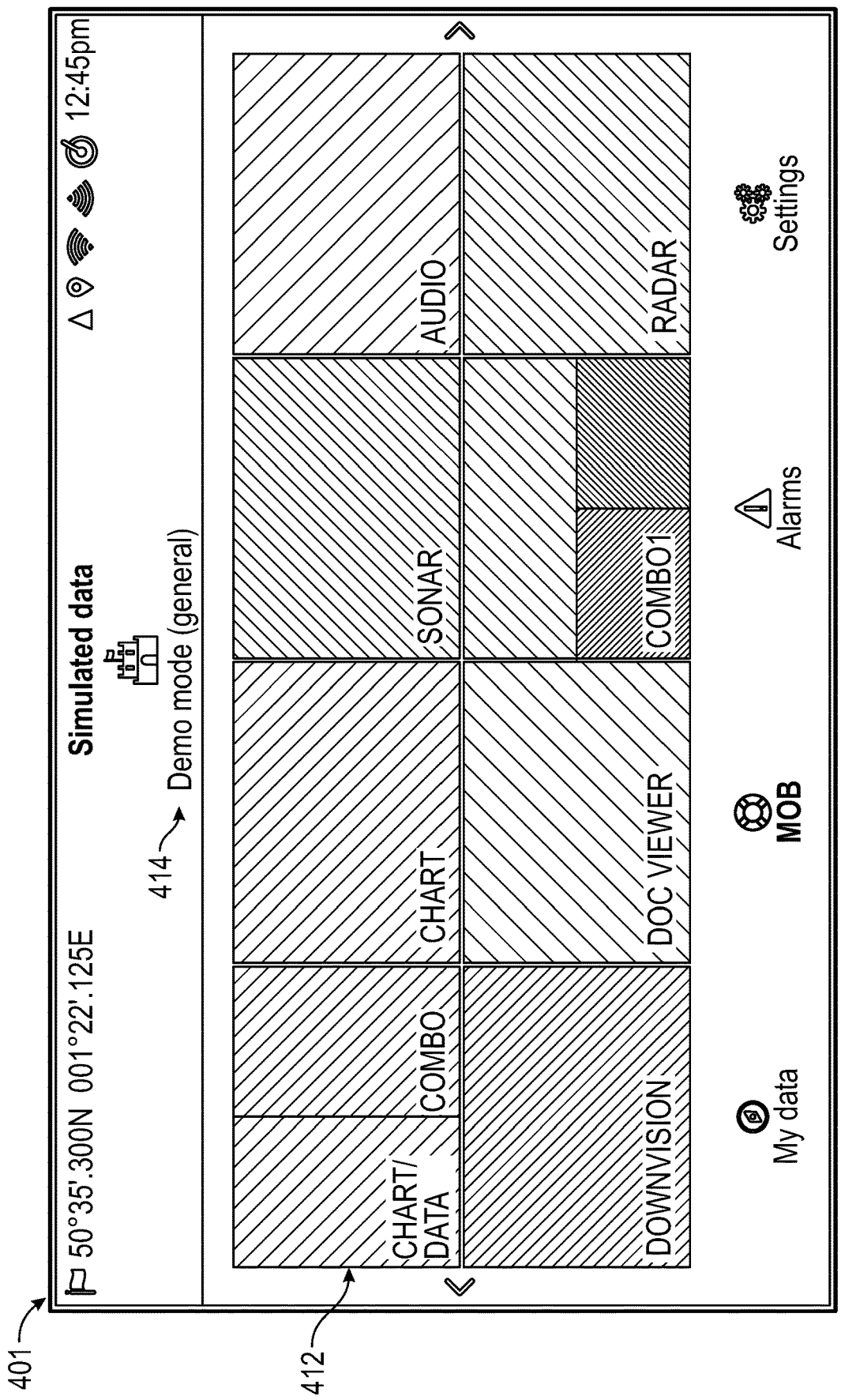
FIGS. 4A and 4B illustrate display view of menus associated with various demo profiles in accordance with embodiments of the disclosure.
Figure 4B:
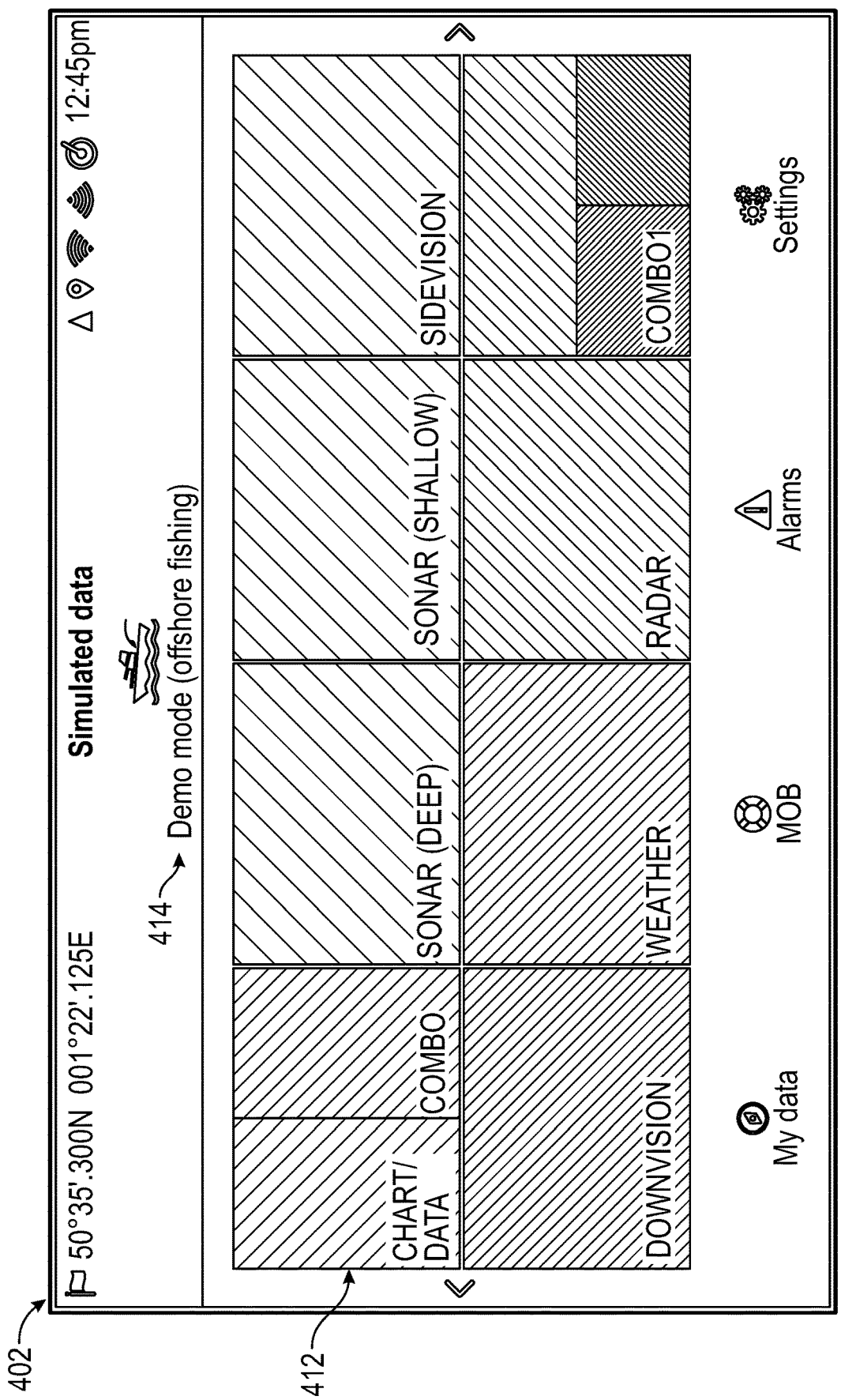

Controller 130 may also be configured to implement demo profiles. Each demo profile may be configured to demonstrate functions associated with a certain type of mobile structure and/or a certain type of activity. For example, as shown in FIG. 4B, the system may implement a demo profile for offshore fishing with a home screen or a main menu that displays functions associated with offshore fishing, such as chart, data, deep/shallow sonar, sidevision, downvision, weather, radar, or other combinations of functions.

Figure 5:
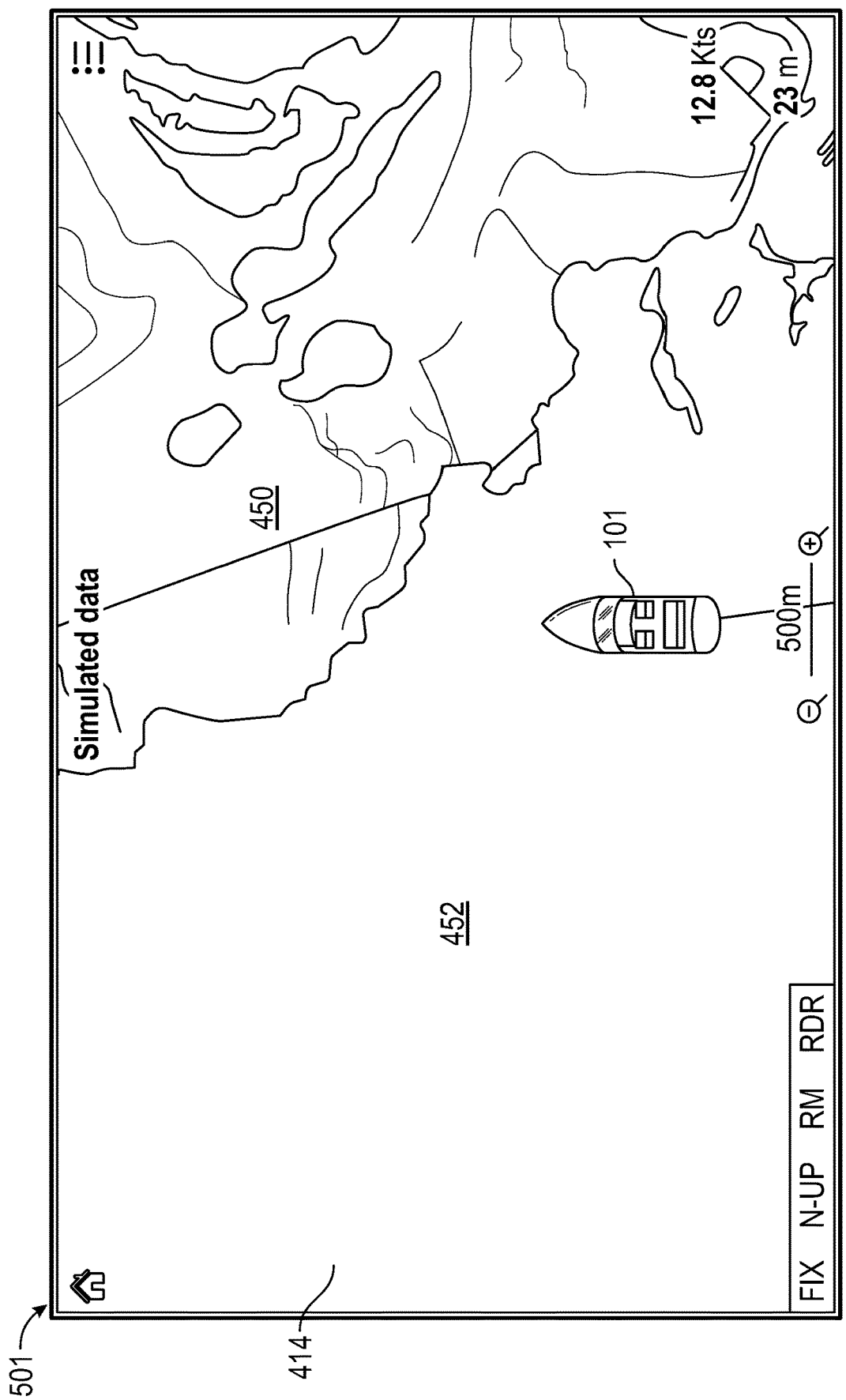
FIG. 5 illustrates a display view of simulated map data in accordance with an embodiment of the disclosure.

For each demo profile, controller 130 may store simulation data which can be used to demonstrate various functions associated with the demo profile. For example, as shown in FIG. 5, controller 130 may store simulation data that allow controller 130 to display a simulated navigation chart to demonstrate the chart function when selected by a user on the home screen or the main menu. Thus, when no live data is received or detected at controller 130, controller 130 may still show the simulated navigation chart to demonstrate to potential customers on how the chart function works.

Figure 8:
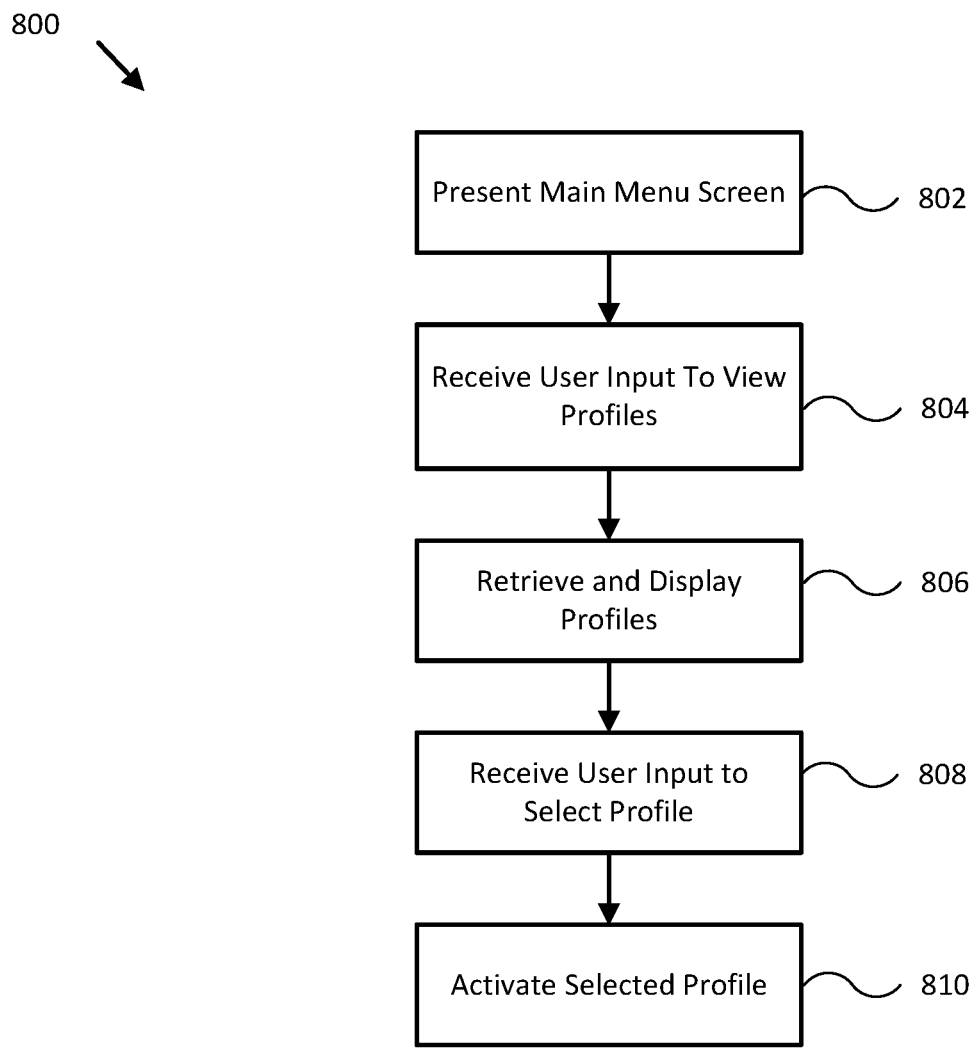
FIG. 8 illustrates a flow diagram of various operations to activate a profile in accordance with embodiments of the disclosure.

Referring now to FIG. 8, FIG. 8 illustrates a flow diagram of process 800 to activate a profile in accordance with embodiments of the disclosure. In some embodiments, the operations of FIG. 8 may be implemented as software instructions executed by one or more logic devices associated with corresponding electronic devices, sensors, and/or structures depicted in FIGS. 1A and 1B. More generally, the operations of FIG. 8 may be implemented with any combination of software instructions and/or electronic hardware (e.g., inductors, capacitors, amplifiers, actuators, or other analog and/or digital components).

It should be appreciated that any step, sub-step, sub-process, or block of process 800 may be performed in an order or arrangement different from the embodiments illustrated by FIG. 8. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 800 is described with reference to systems 100A and 100B and/or display views in FIGS. 3A-7, process 800 may be performed by other systems different from those systems and display views different from those views, including a different selection of electronic devices, sensors, assemblies, mobile structures, mobile structure attributes, user interfaces, graphics, and/or graphics attributes.

When user interface 120 is initially turned on, controller 130 may cause user interface 120 to display a main menu at step 802. The initial main menu may be provided with default settings. For example, controller 130 may store a default profile with default settings defining function buttons to be provided on the main menu. The default settings may be different for different types of vehicles. For example, default settings may be set up by a manufacturer of mobile structure 101 based on a type and/or model of mobile structure 101. In another example, default settings may be set up by an administrative user of mobile structure 101.

For example, for a sail boat, user interface 120/controller 130 may use a skipper profile as the initial profile to be activated when the system is powered on initially, as shown in FIG. 2A. The skipper profile may include default settings and functions provided for the sail boat. The skipper profile may be modified by an administrative user or by a manufacturer of mobile structure 101 to customize initial settings for mobile structure 101. The skipper profile or the default profile may be password protected, such that the default profile may not be modified by non-authorized users.

At step 804, the system may receive user input to view profiles. For example, as shown in FIG. 2A, after the default profile menu or home screen for the skipper profile is displayed, a user may tap or click on the activated profile indicator 214 to bring up a profile menu listing profiles that are available to be activated. In response to the user selecting activated profile indicator 214, controller 130 may retrieve available profiles and present the available profiles to the user at step 806. The profiles may be stored locally at controller 130. In some embodiments, as shown in FIG. 1C, some profiles may be retrieved from a remote distribution server 190 via electronic or wireless network 230. For example, a user may set up and store his/her own profiles online or in the cloud (e.g., cloud computing). The system may allow the user to retrieve his/her profiles from the cloud. In other embodiments, user profiles may be retrieved from a memory residing within and/or integrated with user interface 120 and/or controller 130.

In some embodiments, a user may set up a user cloud account (e.g., a user account on distribution server 190, as described herein). The user cloud account may be linked to or associated with a user profile at an electronic navigation system. For example, when a user profile is activated at an electronic navigation system, the activated user profile may automatically be linked to or synchronized with the user cloud account associated with the activated user profile. The user's operations at the electronic navigation system, such as changes, navigation logs, and the like, may automatically be uploaded to the user's cloud account. The active cloud account on the electronic navigation system may be driven by the active user profile. This allows the user's activities and updates at different vehicles to be collected and synched to the user's cloud account. For example, via the user's cloud account, the user may enjoy seamless transition from one electronic navigation system at a watercraft to another electronic navigation system at another watercraft. The user's activities and navigation logs also may be organized in one place using the user's cloud account.

Figure 3A:
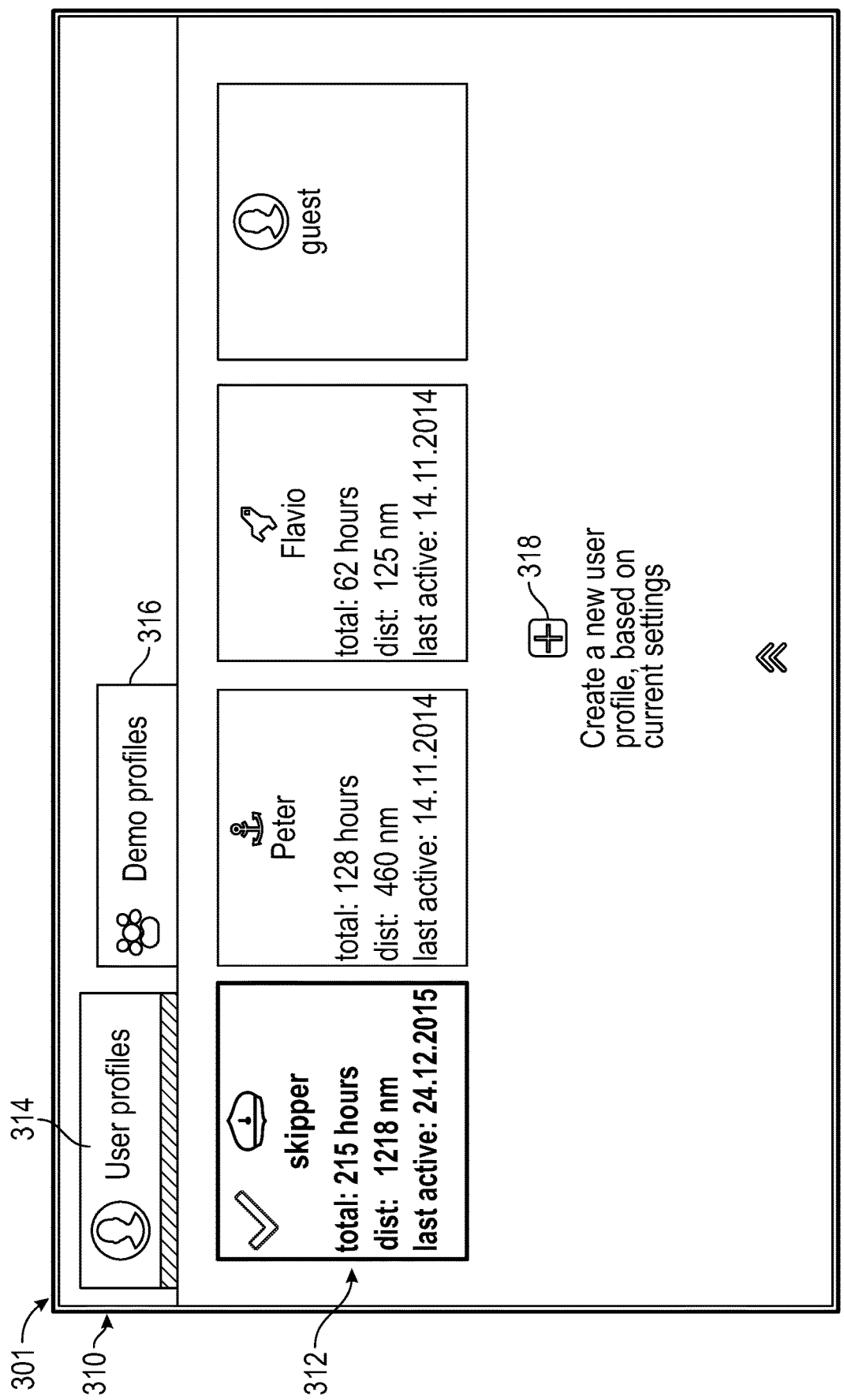
FIG. 3A illustrates a display view of a user profile menu in accordance with embodiments of the disclosure.
Figure 3B:
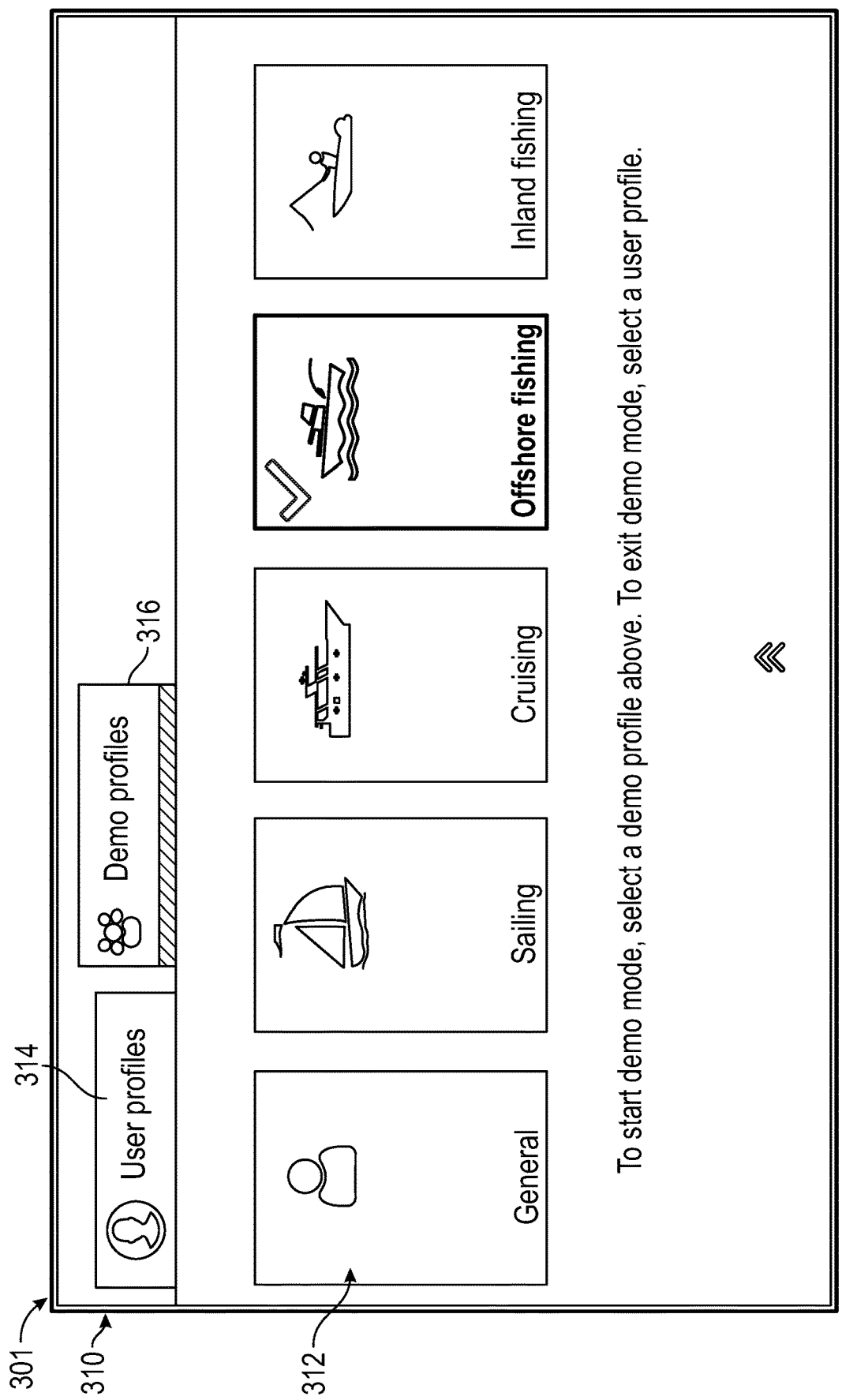
FIG. 3B illustrates a display view of a demo profile menu in accordance with embodiments of the disclosure.

The profiles may be presented in a profile menu, as shown in FIGS. 3A and 3B. There may be two types of profiles: user profiles and demo profiles. User profiles may be set up by users to save and preserve their personal settings and preferences. Demo profiles may be set up for demonstrating functions of specific vehicles or activities. As shown in FIG. 3A, a profile menu 301 may be displayed by user interface 120 in response to a user selecting profile indicator 214 in FIG. 2A.

As shown in FIGS. 3A and 3B, profile menu 301 may include a menu tab display area 310 and a profile display area 312. Menu tab display area 310 may include a user profiles tab 314 and a demo profiles tab 316. User profiles tab 314 and demo profiles tab 316 are selectable by a user such as by tapping or by clicking on the corresponding areas of user interface 120. When user profiles tab 314 is selected, user profiles may be presented in profile display area 312. As shown in FIG. 3A in which user profiles tab 314 is selected and highlighted, user profiles for Skipper, Peter, Flavio, and Guest are displayed in user profile display area 312.

Each user profile may be displayed along with information related to the user profile. For example, as shown in FIG. 3A, the total number of hours a user profile has been active, a number of distance traveled with the user profile, and the last time the user profile was active, and other information may be displayed with each user profile.

Thus, the system may collect and display various statistics of an active profile, such as the cumulative distance traveled using the active profile, the length of time a profile was active. In some embodiments, the system may allow statistics to be collected for inactive profile. For example, a user may be onboard mobile structure 101, but may not currently be the main operator of mobile structure 101. The user can still designate his/her inactive user profile in the onboard mode, such that various statistic information, such as sea miles/time onboard, may be collected for the user. Thus, non-operating users who are onboard and would like to log time on mobile structure 101 may have statistic information collected even when their profiles are not active.

As shown in FIG. 3A, when user profiles tab 314 is selected, a new profile icon 318 may be provided in profile display area 312. New profile icon 318 may be selectable by a user, such as by tapping or by clicking on new profile icon 318, to create a new user profile based on the current settings. For example, a user may start operating user interface 120 with the default skipper profile and may make changes to various settings, such as changing function buttons provided in the home screen or main menu. If the user wishes to save the changes, the user may select new profile icon 318 to create a new user profile under which the changes made by the user may be saved. The system may allow the user to name the new user profile. The system also may allow the user to set up security settings for the new user profile, such as set up password protection to restrict non-authorized use. The system may generate a new icon for the new user profile and add the new icon to the list of user profiles displayed in profile display area 312. As such, the new user profile may later be selected by the user to activate settings associated with the new user profile.

When demo profiles tab 316 is selected, demo profiles may be presented in profile display area 312. As shown in FIG. 3B in which demo profiles tab 316 is selected and highlighted, demo profiles for General, Sailing, Cruising, offshore fishing, and Inland fishing are displayed in user profile display area 312. Different demo profiles may provide different function buttons in the home screen or the main menu for the types of vehicle or the type of activity associated with the demo profile.

For example, in a general demo profile, all features and function buttons of user interface 120 may be available for demonstration. Simulation data also may be provided along with the various features and functions for demonstration. In a sailboat demo profile, functions and features related to fishing, such as sonar, downvision, sidevision, fishing chart mode, fish alarms, and the like, may be excluded. In the sailboat demo profile, functions and features, such as layline, race builder, and the like, may be provided. The default icon for the sailing demo profile may be a sailboat icon. Data pages may default to displaying information for one engine and data app may add sailing page with wind dials and graphs.

In a power cruiser demo profile, sailing features and functions, such as laylines, race builder, and the like, may be excluded. The default icon for the power cruiser demo profile may be a power cruiser icon. Data pages may default to displaying information for two engines and data app may omit the sailing page. In an offshore fishing demo profile, functions and features related to fishing, such as sonar, downvision, sidevision, fishing chart mode, fish alarms, and the like, may be included. The default icon for the offshore fishing demo profile may be a sports fishing boat. Sailing features, such as laylines, race builder, and the like, may be excluded in the offshore fishing demo profile. The data pages may default to displaying information for two engines and the data app may omit the sailing pages. Further, homescreen apps may be sonar-biased and labeled for offshore fishing tasks.

In an inshore fishing demo profile, the fishing features or functions, such as sonar, downvision, sidevision, fishing chart mode, fish alarms, and the like, may be included. Sailing features, such as laylines, race builder, and the like, may be excluded. The default icon for the inshore fishing demo profile may be an inshore fishing boat. Data pages may default to display information for one engine and the data app may omit the sailing pages. Also, radar app may be omitted in the inshore fishing demo profile. Homescreen apps are sonar-biased and labeled for inshore fishing tasks.

Some of the user profiles or demo profiles may be restricted or password protected. For example, a user may make his/her user profile password protected, such that the user's profile may not be accessible by non-authorized users. If a password protected profile is selected, the system may require that a user enter a password before the user is granted access to activate the password protected profile. Other means of user authentication besides password may be used, such as finger print scanning, voice recognition, and the like. In some embodiments, the password protected profile may be linked to an online account (e.g., cloud account). Thus, the password may allow a user to activate and access the profile and the online account.

In some embodiments, the user profiles or demo profiles may be stored in a remote server, such as distribution server 190 in FIG. 1C. For example, a user may set up a user account with the remote server and the user may store user profiles and/or demo profiles with the user account. The user may operate user interface 120 to connect electronically (wired or wirelessly) with the remote server to access and download the user profiles or demo profiles stored at the remote server. For example, when the user selects user profiles tab 314 or demo profiles tab 316, controller 130 may automatically connects electronically with the remote server and may access and retrieve user profiles/demo profiles associated with the user's account stored at the remote server. The retrieved user/demo profiles may be presented to the user at user profile display area 312 for the user's selection and activation. As such, the user may access and use the user's profiles stored at the remote server from any electronic navigation system as long as the electronic navigation system has access to an electronic communication network, such as internet access.

At step 808, the system may receive user input to select a profile presented in the profile menu. For example, a user may tap or click on a profile to select the profile for activation. At step 808, the system may activate the selected profile by implementing settings, configuration, and/or preferences defined in the selected profile. In an example, the system may display and arrange function buttons in a home screen or main menu as defined in the activated profile. Different profiles may define different selections and layouts of function buttons in home screen or main menu.

In some embodiments, mobile structure 101 may include multiple interfaces 120, such as multiple display screens located at different parts of mobile structure 101. The activated profile may define settings and configuration for the different user interfaces 120. A user profile may include different levels of settings some of which are global level settings and some of which are specific to different interfaces 120. For example, global level settings (e.g., boat global level) may affect all user interfaces 120 on mobile structure 101 for all users. Display specific settings (e.g., display local level) may affect a specific user interface, for all users. Profile display level settings may affect all displays on mobile structure 101 for a specific user or demo profile. Profile pageset level settings may affect all instances of a specific pageset (e.g., a split screen of multiple apps) on mobile structure 101, for a specific user or demo profile. Profile app level settings may affect all instances of a specific app within a specific pageset on mobile structure 101, for a specific user or demo profile. Profile app mode level settings may affect all modes of all instances of a specific app within a specific pageset on mobile structure 101, for a specific user or demo profile. Group specific settings may affect a specific group of user interfaces 120. Pane specific settings may affect instances of an application in a specific pane position on a home screen or main menu.

It is contemplated that any one or combination of methods to implement user and/or demo profiles may be performed according to one or more operating contexts of a control loop, for example, such as a startup, learning, running, and/or other type operating context. For example, process 800 may proceed back to block 802 and proceed through process 800 again to produce updated display views and/or imagery, as in a control loop. Embodiments of the present disclosure can thus provide an intuitive user interface and facilitate user/demo profiles and display of corresponding data and/or imagery. Such embodiments may be used to assist in navigation of a mobile structure and/or to assist in the operation of other systems, devices, and/or sensors coupled to the mobile structure.

Figure 9:
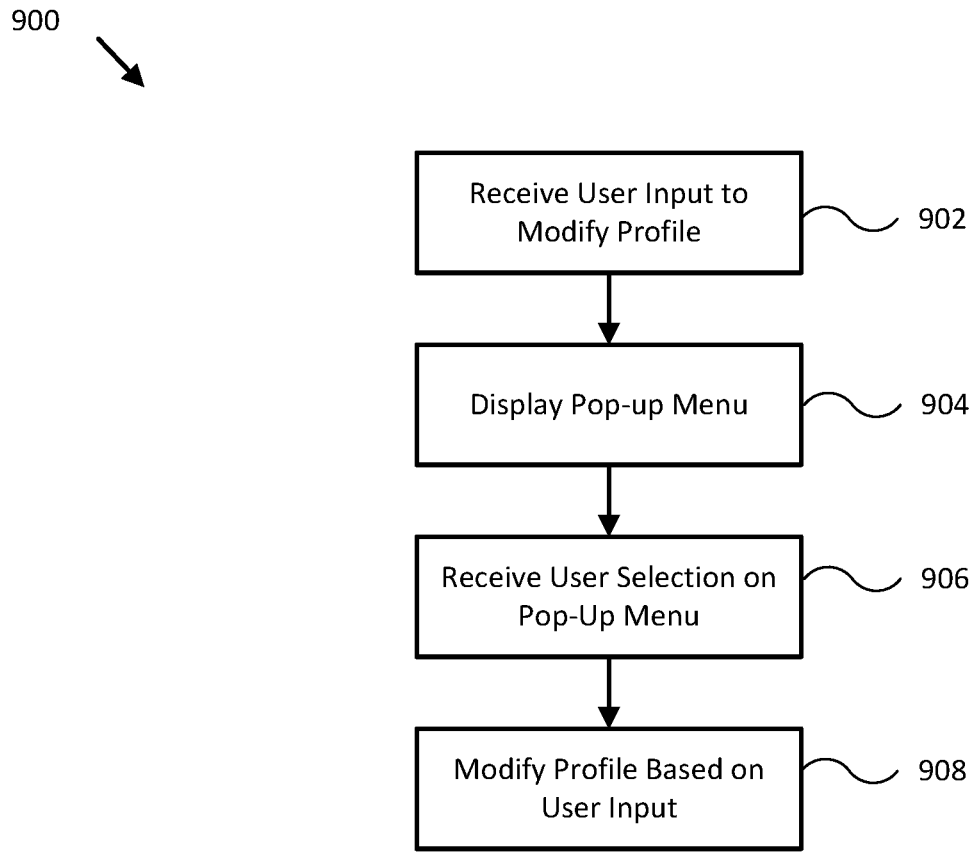
FIG. 9 illustrates a flow diagram of various operations to set up or modify a profile in accordance with embodiments of the disclosure.

Referring now to FIG. 9 which illustrates a flow diagram of process 900 to set up or modify a profile in accordance with embodiments of the disclosure. In some embodiments, the operations of FIG. 9 may be implemented as software instructions executed by one or more logic devices associated with corresponding electronic devices, sensors, and/or structures depicted in FIGS. 1A and 1B. More generally, the operations of FIG. 9 may be implemented with any combination of software instructions and/or electronic hardware (e.g., inductors, capacitors, amplifiers, actuators, or other analog and/or digital components).

Figure 6:
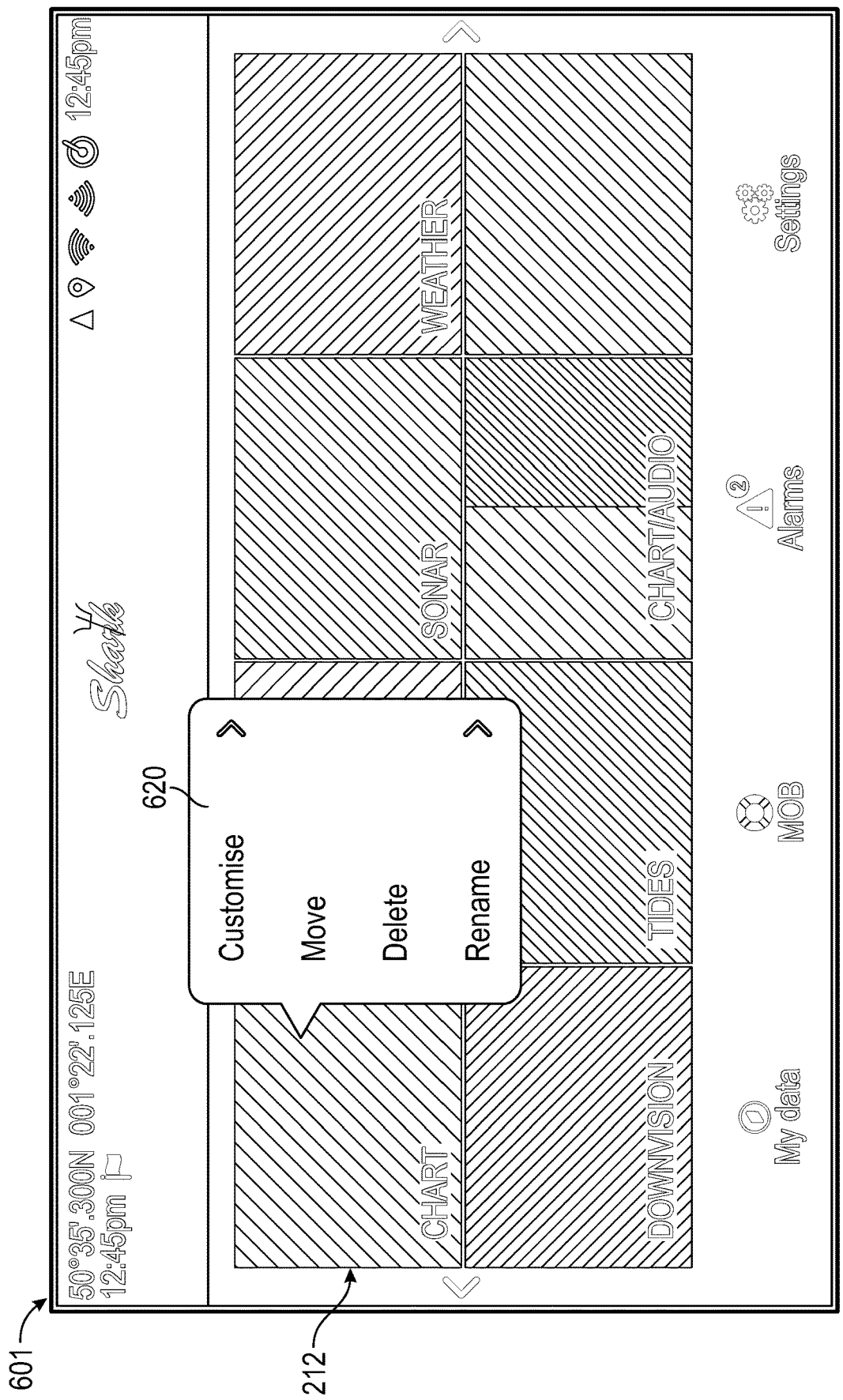
FIG. 6 illustrates a display view of a pop-up menu for changing a menu function/feature in accordance with an embodiment of the disclosure.

At step 902, controller 130 may receive user input to modify profile via user interface 120. For example, as shown in FIG. 6, a user may select and hold a function button for longer than one or second seconds. At step 904, in response to the user's select-and-hold action, controller 130 may display a pop-up menu 620 including various options for modifying the function button. For example, as shown in FIG. 6, pop-up menu 620 may include a customize button selectable by a user to customize the selected function button, a move button selectable by a user to move the function button to a different location in function display area 212, a delete button selectable by a user to delete the selected function button from profile display area 312, and a rename button to rename the selected function button.

Figure 7:
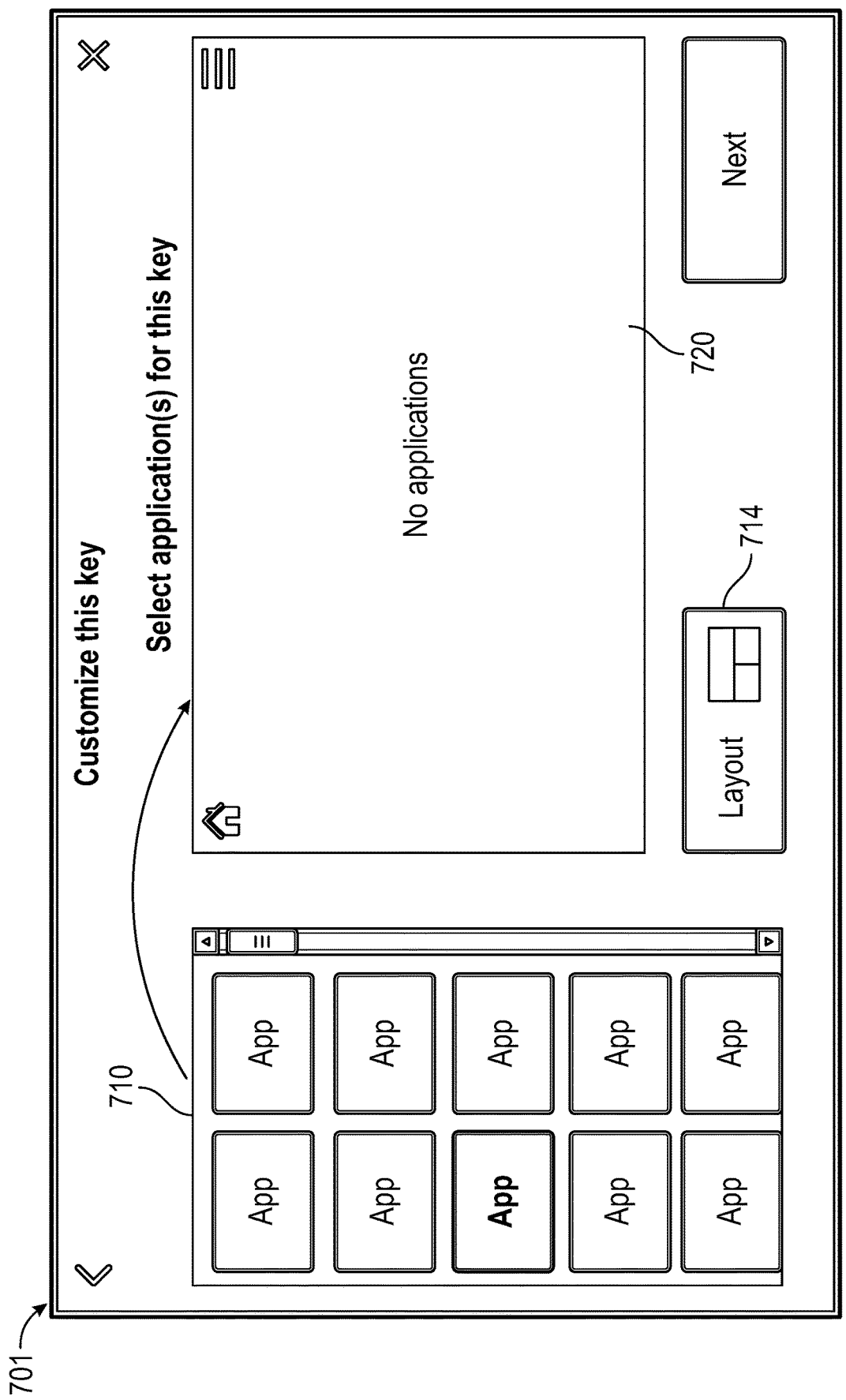
FIG. 7 illustrates a display view of an interface for selecting functions/features in accordance with an embodiment.

At step 906, controller 130 may receive user selection on pop-up menu 620. For example, a user may select one of the buttons on pop-up menu 620 by tapping or clicking on a button. If a user selects the customize button on pop-up menu 620, controller 130 may display a function button customization interface 701 as shown in FIG. 7 for customizing a function button. Function button customization interface 701 may include an app display area 710 listing or presenting various apps or functions that may be selected to be presented in the home screen or main menu. Function button customization interface 701 also may include a selected app display area 720 listing or displaying apps or functions that have been selected by a user.

User interface 120 may allow a user to select apps or functions by selecting and dragging apps from app display area 710 to selected app display area 720. Apps or functions placed in selected app display area 720 may be associated with the function button. A layout button 714 may be provided in user interface 120. Layout button 714 may be selected by a user to allow the user to choose different layouts defining how the apps/functions are displayed within the function button. Thus, multiple functions or apps may be associated with a function button.

After the user finish customizing the function button, the user may finalize and save the changes made to the function button. Controller 130 may then generate and display the customized function button on the main menu or the home screen. In some embodiments, changes made during a user profile may automatically be saved with the user profile. In some embodiments, controller 130 may ask the user whether the changes should be saved with the currently activated user profile or a new user profile should be created to save the changes.

In some embodiments, a user profile may be cloned or copied to create a new profile. As such the initial settings of the copied or cloned prolife may serve as the bases for further modification to create the new profile. Certain profiles or settings may be restricted to the owner or administrator of mobile structure 101. For example, certain profiles or settings may be password protected to prevent non-authorized use. In some embodiments, controller 130 may allow profiles to be uploaded to a remote server or a cloud computing server, such that the uploaded profiles may be accessible by a user from other network-enabled devices.

It should be appreciated that any step, sub-step, sub-process, or block of process 900 may be performed in an order or arrangement different from the embodiments illustrated by FIG. 9. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 900 is described with reference to systems 100A and 100B, and/or display views in FIGS. 3A-7, process 900 may be performed by other systems different from those systems and display views different from those views, including a different selection of electronic devices, sensors, assemblies, mobile structures, mobile structure attributes, user interfaces, graphics, and/or graphics attributes.

It is contemplated that any one or combination of methods to provide user/demo profiles may be performed according to one or more operating contexts of a control loop, for example, such as a startup, learning, running, and/or other type operating context. For example, process 900 may proceed back to block 902 and proceed through process 900 again to produce updated display views and/or imagery, as in a control loop.

Embodiments of the present disclosure can thus provide an intuitive user interface and facilitate user/demo profiles to a user of a mobile device. Such embodiments may be used to assist in navigation of a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system for a mobile structure, the system comprising:
a user interface for the mobile structure, wherein the user interface comprises a display;
a sensor system; and
a logic device configured to communicate with the user interface and the sensor system, wherein the logic device is adapted to:
retrieve a profile defining settings of the user interface, wherein the profile comprises simulation data configured to simulate live data for demonstrating functions of the user interface;
determine that the profile is activated; and
configure the user interface based on the settings defined by, the profile, wherein the settings of the user interface are associated with controlling operation of the sensor system and selective generation of at least one display view for the display of the user interface that is associated with the controlling operation of the sensor system.

2. The system of claim 1, wherein the logic device is adapted to:
receive a user selection of the profile via the user interface to activate the profile; and
activate the profile based on the user selection of the profile.

3. The system of claim 2, wherein the logic device is adapted to display one or more function buttons on the display of the user interface based on the settings defined by the profile.

4. The system of claim 3, wherein the one or more function buttons are selected based on the settings defined by the profile.

5. The system of claim 3, wherein;
the mobile structure comprises a watercraft;
the sensor system is coupled to the mobile structure, wherein the sensor system comprises one or more of an orientation sensor, an accelerometer, a position sensor, a visible spectrum camera, an infrared spectrum camera, a radar system, and/or a sonar system; and
a layout of the one or more function buttons on the user interface is defined by the profile.

6. The system of claim 1, wherein the logic device is adapted to:
receive user input to modify the settings in the profile; and
modify the settings in the profile based on the user input.

7. The system of claim 1, wherein the logic device is adapted to:
link the profile to a user account at a remote server; and store the profile in the user account on the remote server via a network.

8. The system of claim 1, wherein the profile is designated for a particular type of the mobile structure or a particular type of activity and the user interface is configured to provide functions related to the particular type of the mobile structure or the particular type of activity.

9. The system of claim 1, wherein the profile comprises global settings applicable to multiple user interfaces of the mobile structure and local settings applicable to the user interface.

10. A method comprising:
retrieving a profile defining settings of a user interface of a mobile structure, wherein the user interface comprises a display, and wherein the profile comprises simulation data configured to simulate live data for demonstrating functions of the user interface;
determining that the profile is activated; and
configuring the user interface based on the settings defined by the profile, wherein the settings of the user interface are associated with controlling operation of a sensor system for the mobile structure and selective generation of at least one display view for the display of the user interface that is associated with the controlling operation of the sensor system.

11. The method of claim 10, further comprising:
receiving a user selection of the profile via the user interface to activate the profile; and
activating the profile based on the user selection of the profile.

12. The method of claim 11, further comprising displaying one or more function buttons on the display of the user interface based on the settings defined by the profile.

13. The method of claim 12, wherein the one or more function buttons are selected based on the settings defined by the profile.

14. The method of claim 12, wherein a layout of the one or more function buttons on the user interface is defined by the profile.

15. The method of claim 10, further comprising:
receiving user input to modify the settings in the profile; and
modifying the settings in the profile based on the user input.

16. The method of claim 10, wherein the profile is retrieved from a remote server via a network.

17. The method of claim 10, wherein the profile is designated for a particular type of the mobile structure or a particular type of activity and the user interface is configured to provide functions related to the particular type of the mobile structure or the particular type of activity.

18. The method of claim 10, wherein the profile comprises global settings applicable to multiple user interfaces of the mobile structure and local settings applicable to the user interface.

* * * * *